(12) United States Patent
Nagai et al.

(10) Patent No.: US 6,254,277 B1
(45) Date of Patent: Jul. 3, 2001

(54) ROLLER BEARING

(75) Inventors: Yasuaki Nagai, Kashiwara; Kenji Shitsukawa; Kenji Asano, both of Osaka; Masamichi Shibata, Mie, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/445,390

(22) PCT Filed: Jul. 7, 1998

(86) PCT No.: PCT/JP98/03053

§ 371 Date: Dec. 7, 1999

§ 102(e) Date: Dec. 7, 1999

(87) PCT Pub. No.: WO99/02874

PCT Pub. Date: Jan. 21, 1999

(30) Foreign Application Priority Data

Jul. 9, 1997 (JP) .................................................. 9-183539

(51) Int. Cl.$^7$ ................................................... F16C 19/26
(52) U.S. Cl. ........................... 384/450; 384/565; 384/569; 384/571

(58) Field of Search ...................................... 384/450, 565, 384/569, 571, 568

(56) References Cited

U.S. PATENT DOCUMENTS 4,877,340   10/1989   Hoeprich .

FOREIGN PATENT DOCUMENTS 0 347 247   12/1989   (EP) .
2-107810    4/1990    (JP) .

Primary Examiner—Lenard A. Footland
(74) Attorney, Agent, or Firm—Wenderoth, Lind & Ponack, L.L.P.

(57) ABSTRACT

There is provided a roller bearing in which contact stress between a roller and a raceway is uniformized by optimizing a configuration of a clearance between the roller and the raceway. A configuration of an outer circumferential surface (8) of a tapered roller (6) of a tapered roller bearing (1) is defined so that a clearance of $Y(x)=kYp(x)$, which results from multiplying an equation $Yp(x)$ for uniformizing contact stress between infinite-width plate and tapered roller by a positive number $k=1.5–10$, is formed between the raceway surface (4, 5) and the outer circumferential surface (8) of the tapered roller (6). The tapered roller (6) relaxes concentration of contact stresses, improving the durability.

3 Claims, 3 Drawing Sheets

LOGARITHMIC CROWNING
AND STRESS DISTRIBUTION

LIFE TEST

TRAPEZOIDAL CROWNING AND
STRESS DISTRIBUTION

ROLLER BEARING

TECHNICAL FIELD

The present invention relates to cylindrical roller bearings or tapered roller bearings and, more specifically, to a roller bearing suitable for use under heavy load or high moment load.

BACKGROUND ART

Conventionally, as this type of roller bearing, there has been provided one in which tapered rollers are placed between inner and outer rings, both end portions of an outer circumferential surface of each tapered roller being subjected to trapezoidal crowning so as to reduce edge loads that act on both end portions of the tapered roller.

However, even a conventional tapered roller bearing in which trapezoidal crowning has been applied to both end portions of an outer circumferential surface of each tapered roller as mentioned above has a problem that contact stress becomes extremely high locally at some places as shown in FIG. 5(B).

In FIG. 5(A), the abscissa shows the distance of the raceway surface of the inner ring from the raceway center of the inner ring along a generatrix, i.e., inner-ring generatrix position, while the ordinate shows the crowning depth that is a clearance between the tapered roller and raceway surface. Also, in FIG. 5(B), the abscissa shows the inner-ring generatrix position, while the ordinate shows contact stress produced between roller and inner-ring raceway surface. As can be seen from FIGS. 5(A) and 5(B), in this tapered roller bearing, contact stresses are produced, concentrated at places where the crowning starts.

FIGS. 5(A) and 5(B) assume a state in which a moment load is applied to the bearing, where the inclination angle between inner and outer rings of the bearing is set at 0°6'. In this case, since contact stresses are concentrated particularly on a one-side start place of the crowning, the bearing is further shortened in life.

Because of the occurrence of stress concentration at places where the crowning starts as shown above, the conventional tapered roller bearing has a problem that its life becomes shorter when subjected to heavy load or high moment load.

It is therefore an object of the present invention to provide a roller bearing in which contact stress between rollers and raceway is uniformized by optimizing the configuration of a clearance between the rollers and the raceway.

DISCLOSURE OF THE INVENTION

In order to attain the above object, the present invention provides a roller bearing having an inner ring, an outer ring and a plurality of rollers, characterized in that:

in a state in which an outer circumferential surface of each of the rollers and a raceway surface of the inner ring or a raceway surface of the outer ring have been brought into contact with each other under no load so that a roller profile which is a line of intersection between a plane passing through an axis of the roller and the outer circumferential surface of the roller and an outer-ring profile which is a line of intersection between the raceway surface of the outer ring and a plane passing through an axis of the outer ring, or the roller profile and an inner-ring profile which is a line of intersection between the raceway surface of the inner ring and a plane passing through an axis of the inner ring, are in contact with each other under no load, if a magnitude of a clearance between the roller profile and the outer-ring profile or the inner-ring profile is represented by Y(x) and if such a magnitude of a clearance between the roller profile and the inner-ring profile or the outer-ring profile as can make uniform stress applied to between contact surfaces of the outer circumferential surface of the roller and the raceway surface of the outer ring or the raceway surface of the inner ring based on an elastic contact theory is represented by Yp(x), then the following equation holds:

$$Y(x)=kYp(x)$$

where x is a distance from an axial center of the roller along a tangent line common to the two profiles that are in contact with each other under no load, and k is a positive constant.

According to the roller bearing of the present invention, the magnitude Y(x) of the clearance between the roller profile and the outer-ring profile or the inner-ring profile is a value which results from multiplying, by k (a positive number), such a magnitude Yp(x) of the clearance between the roller profile and the inner-ring profile or the outer-ring profile as can make uniform stress applied to between contact surfaces of the outer circumferential surface of the roller and the raceway surface of the outer ring or the raceway surface of the inner ring based on the elastic contact theory. This elastic contact theory is based on the assumption of an infinite length and not applicable to actual rollers of finite lengths. Therefore, providing the clearance of Y(x)=kYp(x), which results from merely multiplying the Yp(x) by k (a positive number), allows edge loads to be relaxed so that relatively uniform load is applied to the rollers and the raceway surfaces in rollers of finite lengths. Accordingly, the tapered roller bearing of the invention is capable of enduring heavy loads and high moment loads, thus being prolonged in life.

Also, in the roller bearing of one embodiment, the Yp(x) is a logarithmic curve shown by an equation:

$$Yp(x)=\{(1-\nu_1^2)/E_1+(1-\nu_2^2)/E_2\}Qd\times\log\{1-2x/la)^2\}^{-1}/(\pi \cdot la)$$

where $E_1$ is a Young's modulus of the roller, $E_2$ is a Young's modulus of the inner and outer rings, $\nu_1$ is a Poisson's ratio of the roller, $\nu_2$ is a Poisson's ratio of the inner and outer rings, Qd is a load of the roller, and la is an effective length of the roller profile.

In this roller bearing, because the Yp(x) is the logarithmic curve as shown above, the contact stress between roller and raceway surface is greatly uniformized so that breakage due to repetition fatigue is unlikely to occur, the roller bearing being prolonged in life.

Further, in the roller bearing of one embodiment, a value of k is within a range of 1.5 to 10.

It was found out by an experiment that edge loads become larger with the value of k less than 1.5, and that an axial central load of the outer circumferential surface becomes larger with the value of k more than 10. With the value of k falling within a range of 1.5 to 10, improvement in durability was recognized as compared with the prior art.

BEST MODE FOR CARRYING OUT THE INVENTION

Hereinbelow, the present invention is described in more detail by embodiments thereof illustrated in the accompanying drawings.

Figure 1:
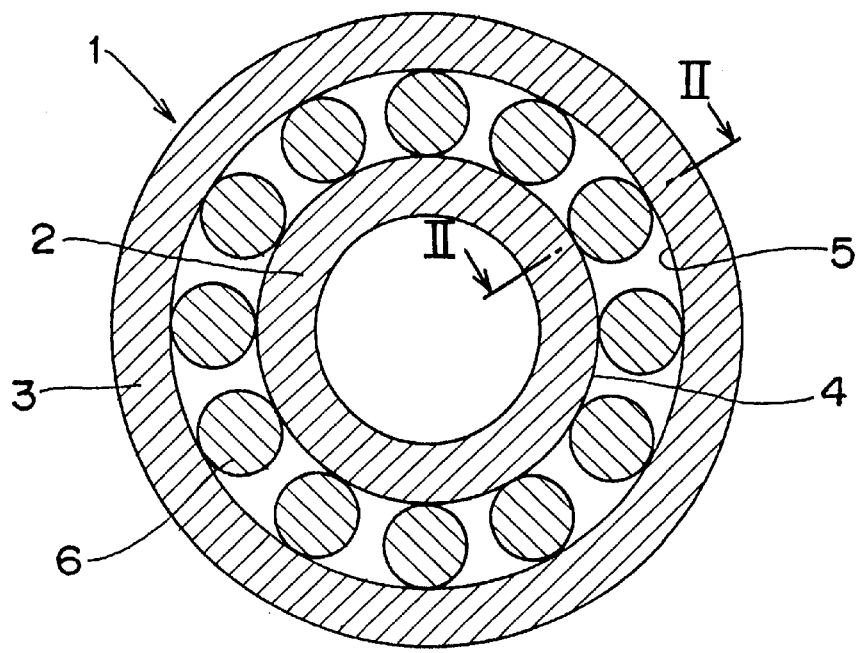
FIG. 1 is a front view of a tapered roller bearing in an embodiment of the present invention.
Figure 2:
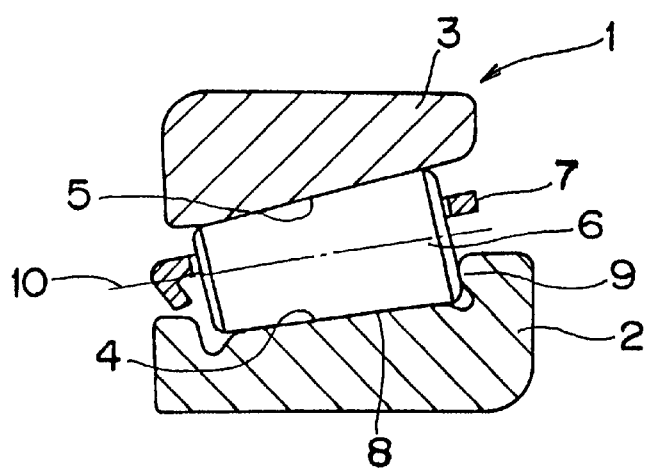
FIG. 2 shows a sectional view taken along the line II—II of FIG. 1.

As shown in FIGS. 1 and 2, a tapered roller bearing 1 in an embodiment of the present invention comprises an inner ring 2, an outer ring 3, tapered rollers 6 and a cage 7 (shown in FIG. 2 only and omitted in FIG. 1). A large-diameter side end portion of each of the tapered rollers 6 is pressed against a large flange 9 of the inner ring 2 so that the tapered roller 6 is positioned axially.

As shown in FIG. 2, when a generally conical raceway surface 4 of the inner ring 2 or a generally conical raceway surface 5 of the outer ring 3 and an outer circumferential surface 8 of the tapered roller 6 are in contact with each other under no load, there arises a later-described clearance therebetween, although not shown.

The distance between a profile which is a line of intersection between a plane passing through an axis 10 of the tapered roller 6 and the outer circumferential surface 8 of the tapered roller 6, and the tapered raceway surface 4 or 5 is set so as to satisfy the following equation, $Y(x)=kyp(x)$. That is, a profile of the outer circumferential surface 8 of the tapered roller 6 has a configuration as defined by this $Y(x)$ with respect to a plane tangent to the profile.

In this connection, the $Yp(x)$ is the following Lundberg' equation $Yp(x)$ based on the elastic contact theory for uniformizing contact stress between an infinite-width plate and a roller, and k is a positive number of 1.5 to 10:

$$Yp(x)=\{(1-v^2)/E_1+(1-v_2^2)/E_2\}Qd\times\log\{1-2x/la)^2\}^{-1}/(\pi\cdot la)$$

where x is the distance from the axial center of the tapered roller along a tangent line common to the outer circumferential surface and raceway surface of the tapered roller; $E_1$ is a Young's modulus of the roller, $E_2$ is a Young's modulus of the inner and outer rings, $v_1$ is a Poisson's ratio of the roller, $v_2$ is a Poisson's ratio of the inner and outer rings, Qd is a load of the roller, i.e., rolling element, and la is an effective length of the generatrix (length of the generatrix excluding chamfered portions) on the assumption that the outer circumferential surface of the tapered roller is a conical surface.

Figure 3A:
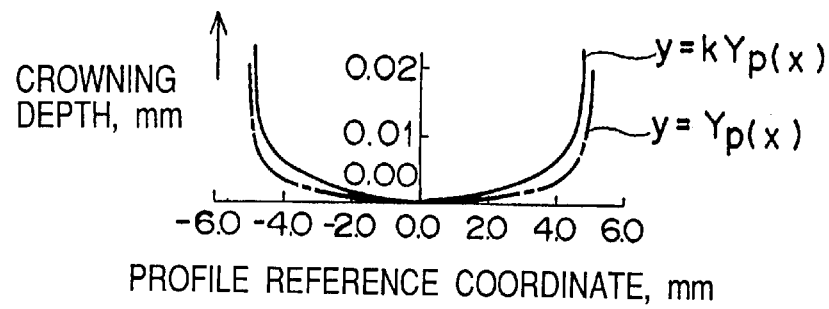
FIGS. 3(A) and 3(B) show crowning depth and a stress distribution of logarithmic crowning in a tapered roller bearing of the invention.
Figure 3B:
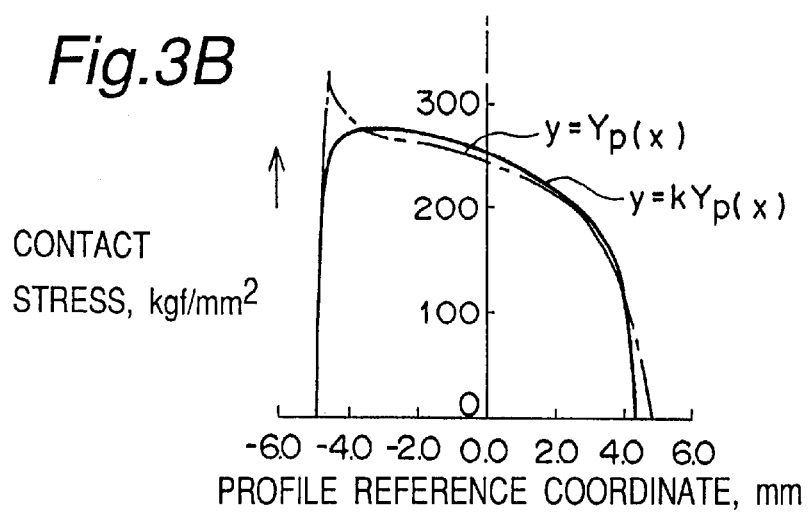

Therefore, when the outer circumferential surface 8 of the tapered roller 6 and the raceway surface 4 of the inner ring 2 are in contact with each other under no load, the magnitude of the clearance between the profile of the tapered roller 6 and the profile of the inner ring 2 or outer ring 3 is $Y(x)=kYp(x)$ FIGS. 3(A) and 3(B) show experimental results of this embodiment. In FIG. 3(A), in the state that the outer circumferential surface 8 of the tapered roller 6 and the conical raceway surface 4 of the inner ring 2 or the conical raceway surface 5 of the outer ring 3 are in contact with each other under no load, the abscissa shows the distance from the axial center of the tapered roller 6 along the generatrix of the conical raceway surface 4 or 5, i.e., the profile reference coordinate, while the ordinate shows crowning depth which is a clearance between the tapered roller and the conical raceway surface 4 or 5. In FIG. 3(B), the abscissa shows the profile reference coordinate while the ordinate shows contact stress produced between the roller and the raceway surface. Also in FIGS. 3(A) and 3(B), the inclination angle between the inner ring 2 and outer ring 3 of the bearing is set to 0°6'. In this case, with respect to the same value of the profile coordinate other than 0, if k is a positive value larger than 1, then the crowning depth becomes larger in value with the increasing value of k. As apparent from FIG. 3(B), it can be seen that concentration of contact stress occurs at k=1.0, whereas no concentration of contact stress occurs and the distribution of contact stress becomes smoother at k=4.0.

With the value of k smaller than 1.5, contact stress at an axial central portion of the outer circumferential surface 8 of the tapered roller 6 becomes smaller, but the crowning depth becomes smaller so that stresses are concentrated on axial end portions of the outer circumferential surface 8 of the tapered roller 6. With the value of k larger than 10, on the other hand, contact stresses at axial end portions of the outer circumferential surface 8 of the tapered roller 6 become smaller, but contact stress at an axial, generally central portion of the outer circumferential surface 8 of the tapered roller 6 becomes excessive.

It has been found out by an experiment that if the value of k is within a range of 1.5–10, the distribution of contact stresses becomes flat, making the roller and the raceway surfaces less prone to breakage due to repetition fatigue, with a result of improved durability.

Figure 4:
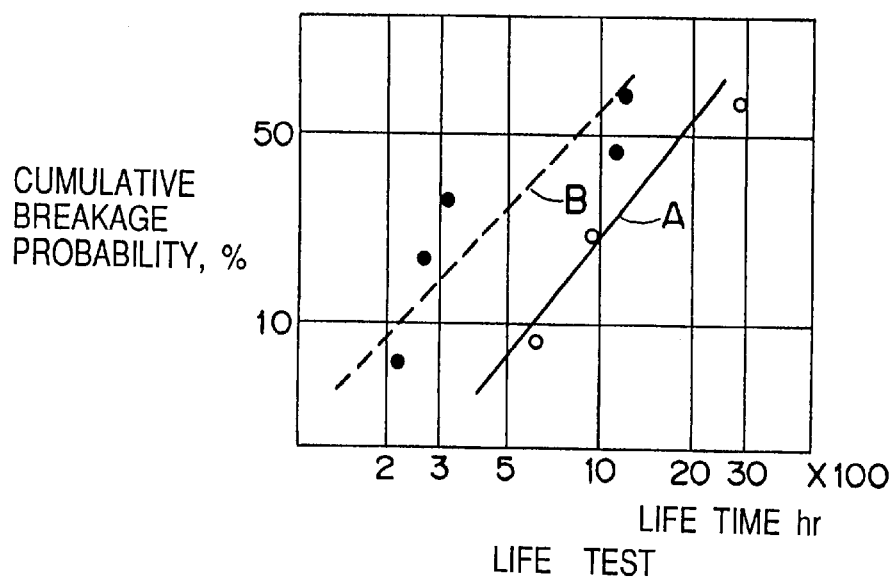
FIG. 4 shows results of a life comparison test between a tapered roller bearing of logarithmic crowning according to the invention and a tapered roller bearing of trapezoidal crowning according to the prior art.
Figure 5A:
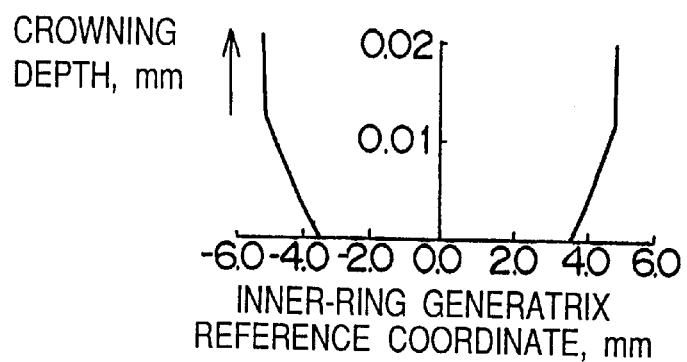
FIGS. 5(A) and 5(B) show trapezoidal crowning and stress distribution of a tapered roller bearing of the prior art.
Figure 5B:
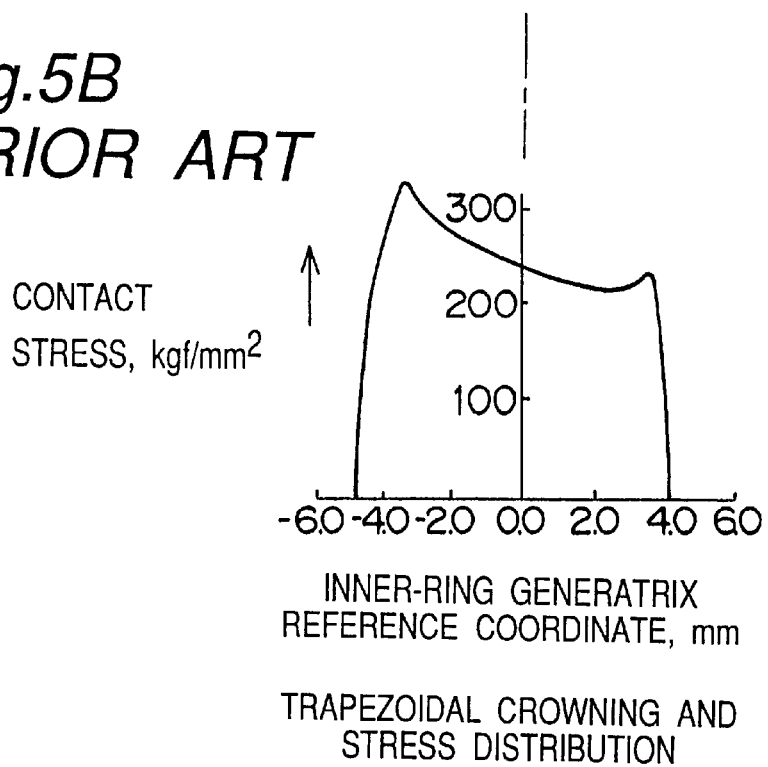

FIG. 4 shows results of this experiment. The experiment of FIG. 4 was carried out in clean oil by using the tapered roller 6 of k=4.0 with an inclination angle of the outer ring 3 and the inner ring 2 of 0°6' and under a load of 0.72× effective dynamic rated load. In FIG. 4, the life time of this embodiment is shown by solid line A, while the life time of the conventional trapezoidal crowning is shown by broken line B. As apparent from FIG. 4, the tapered roller bearing of this embodiment is about 2.7 times longer in life than the tapered roller bearing of the conventional trapezoidal crowning. It can be understood from this fact that the tapered roller bearing of this embodiment is much prolonged in life.

Although the above embodiment has been described with regard to a tapered roller bearing, yet the present invention is of course applicable to cylindrical roller bearings.

Further, although $Y(x)$, which results from multiplying Lundberg' equation $Yp(x)$ by a constant k, has been applied to the outer circumferential surface of the tapered roller in the above embodiment, yet the $Y(x)$ may also be applied to the raceway surface of the inner ring or outer ring, or otherwise, the configuration of the outer circumferential surface of the roller and the raceway surface may be modified from a conical surface or a cylindrical surface so that the clearance between the outer circumferential surface of the roller and the raceway surface satisfies-the above $Y(x)$.

INDUSTRIAL APPLICABILITY

As described above, the bearing according to the present invention is suitable for use as a cylindrical roller bearing or tapered roller bearing under high load or high moment load.

What is claimed is:
1. A roller bearing (1), having an inner ring (2), an outer ring (3) and a plurality of rollers (6), characterized in that:
   in a state in which an outer circumferential surface (8) of each of the rollers (6) and a raceway surface (4) of the inner ring (2) or a raceway surface (5) of the outer ring (3) have been brought into contact with each other under no load so that a roller profile which is a line of intersection between a plane passing through an axis of the roller (6) and the outer circumferential surface (8) of the roller (6) and an outer-ring profile which is a line of intersection between the raceway surface (5) of the outer ring (3) and a plane passing through an axis of the outer ring (3), or the roller profile and an inner-ring profile which is a line of intersection between the raceway surface (4) of the inner ring (2) and a plane passing through an axis of the inner ring (2), are in contact with each other under no load, if a magnitude of a clearance between the roller profile and the outer-ring profile or the inner-ring profile is represented by Y(x) and if such a magnitude of a clearance between the roller profile and the inner-ring profile or the outer-ring profile as can make uniform stress applied to between contact surfaces of the outer circumferential surface (8) of the roller (6) and the raceway surface (5) of the outer ring (3) or the raceway surface (4) of the inner ring (2) based on an elastic contact theory is represented by Yp(x), then the following equation holds:

$$Y(x) = k y p(x)$$

where x is a distance from an axial center of the roller along a tangent line common to the two profiles that are in contact with each other under no load, and k is a positive constant.

2. The roller bearing (1) according to claim 1, wherein the Yp(x) is a logarithmic curve shown by an equation:

$$Yp(x) = \{(1-v_1^2)/E_1 + (1-v_2^2)/E_2\} Qd \times \log\{1-2x/la)^2\}^{-1}/(\pi \cdot la)$$

where $E_1$ is a Young's modulus of the roller, $E_2$ is a Young's modulus of the inner and outer rings, $v_1$ is a Poisson's ratio of the roller, $v_2$ is a Poisson's ratio of the inner and outer rings, Qd is a load of the roller, and la is an effective length of the roller profile.

3. The roller bearing according to claim 2, wherein a value of k is within a range of 1.5 to 10.

* * * * *